United States Patent
Mitsuki

(10) Patent No.: US 8,498,051 B2
(45) Date of Patent: Jul. 30, 2013

(54) ZOOM LENS SYSTEM, OPTICAL APPARATUS, AND METHOD FOR FORMING AN IMAGE

(75) Inventor: Shinichi Mitsuki, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/447,658

(22) Filed: Apr. 16, 2012

(65) Prior Publication Data

US 2012/0200923 A1 Aug. 9, 2012

Related U.S. Application Data

(63) Continuation of application No. 12/112,840, filed on Apr. 30, 2008, now abandoned.

(30) Foreign Application Priority Data

May 29, 2007 (JP) .................................. 2007-142228
Apr. 24, 2008 (JP) .................................. 2008-113408

(51) Int. Cl.
*G02B 27/64* (2006.01)
*G03B 17/00* (2006.01)

(52) U.S. Cl.
USPC ........... 359/557; 359/676; 359/679; 359/684; 359/687; 359/695; 396/55

(58) Field of Classification Search
USPC ................. 359/554, 557, 676, 677, 679, 684, 359/686, 687, 694–698; 396/55, 82, 91
See application file for complete search history.

(56) References Cited

U.S. PATENT DOCUMENTS

| | | | |
|---|---|---|---|
| 4,789,227 A | 12/1988 | Tanaka et al. | |
| 4,802,747 A | 2/1989 | Horiuchi | |
| 5,477,297 A | 12/1995 | Suzuki | |
| 6,285,502 B1 | 9/2001 | Konno et al. | |
| 6,324,018 B1 | 11/2001 | Kawamura | |
| 6,791,762 B2 | 9/2004 | Yamada | |
| 6,853,501 B2 | 2/2005 | Mukaiya | |

(Continued)

FOREIGN PATENT DOCUMENTS

| | | |
|---|---|---|
| CN | 1682141 A | 10/2005 |
| JP | 63-204216 | 8/1988 |

(Continued)

OTHER PUBLICATIONS

Machine Translation of JP 06-289296 from http://www4.ipdl.inpit.go.jp/Tokujitu/tjsogodbenk.ipdl.*

(Continued)

*Primary Examiner* — Frank Font
(74) *Attorney, Agent, or Firm* — Miles & Stockbridge P.C.

(57) ABSTRACT

Providing a zoom lens system having a high zoom ratio being compact with high optical performance. The system includes, in order from an object along an optical axis, a first lens group G1 having positive refractive power, a second lens group G2 having negative refractive power, at least one lens group having positive refractive power, and an n-th lens group GN being disposed to the most image side. The n-th lens group GN with positive refractive power includes, in order from the object, a front group GNa and a rear group GNb having positive refractive power. Focusing on an object is carried out by moving the rear group GNb along the optical axis, and a given conditional expression is satisfied.

38 Claims, 11 Drawing Sheets

U.S. PATENT DOCUMENTS

| | | |
|---|---|---|
| 7,126,760 B2 | 10/2006 | Yamada |
| 7,139,130 B2 | 11/2006 | Yamada |
| 7,242,532 B2 | 7/2007 | Shibayama et al. |
| 7,554,749 B2 | 6/2009 | Eguchi et al. |
| 7,586,682 B2 | 9/2009 | Ohtake et al. |
| 7,672,063 B2 * | 3/2010 | Take .............................. 359/687 |
| 8,009,972 B2 | 8/2011 | Kuroda et al. |
| 8,295,694 B2 * | 10/2012 | Sogoh et al. .................... 396/55 |
| 2006/0072200 A1 | 4/2006 | Yamada |
| 2007/0091461 A1 | 4/2007 | Saori |
| 2009/0268310 A1 | 10/2009 | Honjo et al. |

FOREIGN PATENT DOCUMENTS

| | | |
|---|---|---|
| JP | 06-289296 A | 10/1994 |
| JP | 06-289298 A | 10/1994 |
| JP | 2003-241097 A | 8/2003 |
| JP | 2004-240464 A | 8/2004 |
| JP | 2007-114432 A | 5/2007 |

OTHER PUBLICATIONS

Machine Translation of JP 2004-240464 from http://www4.ipdl.inpit.go.jp/Tokujitu/tjsogodbenk.ipdl.*

* cited by examiner

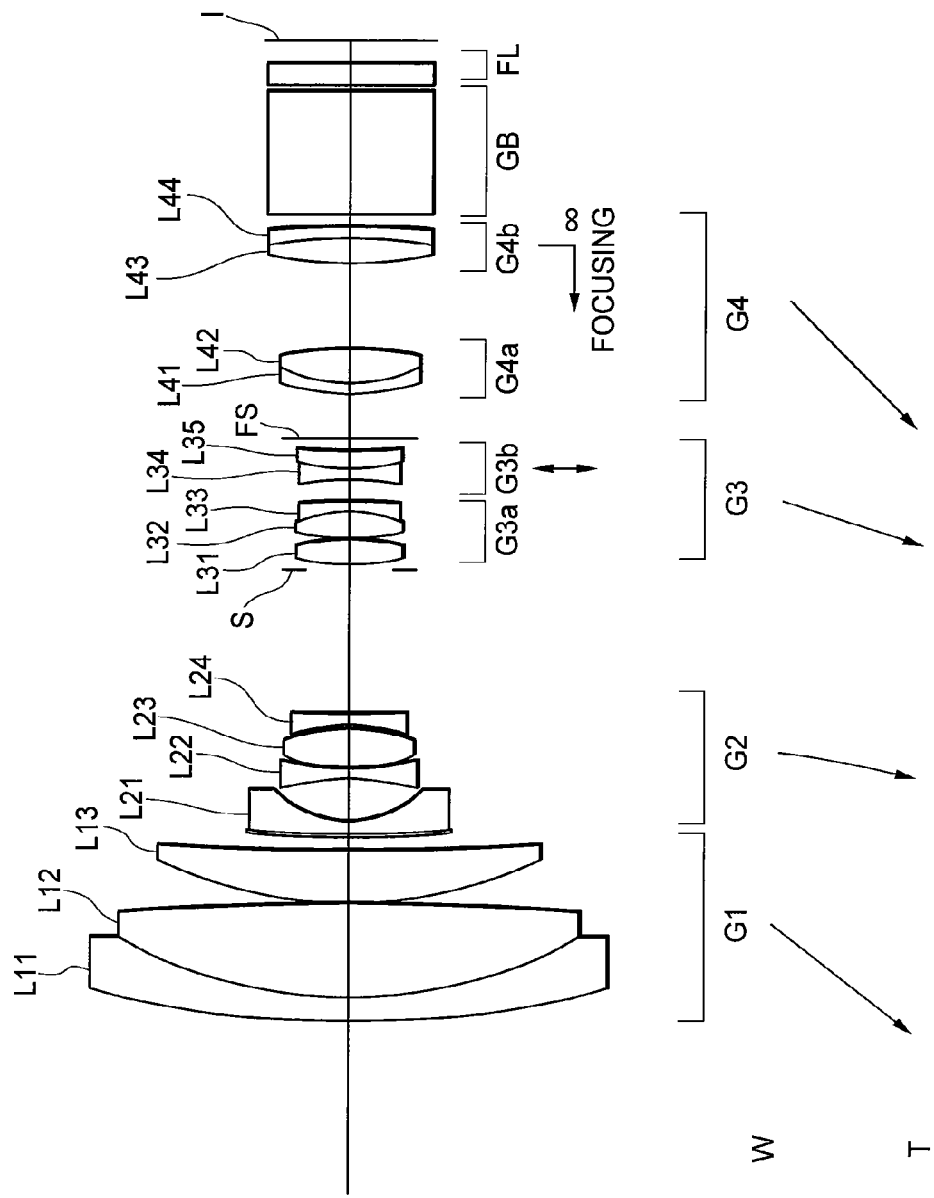

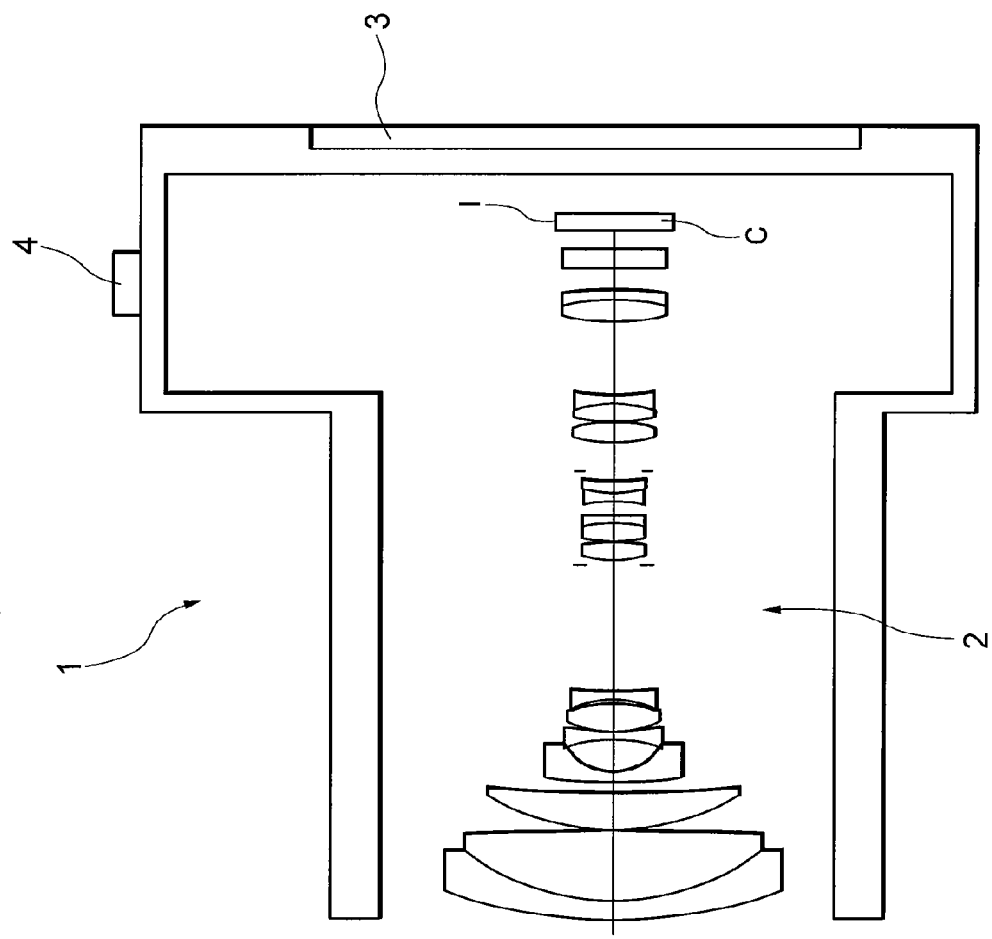

ZOOM LENS SYSTEM, OPTICAL APPARATUS, AND METHOD FOR FORMING AN IMAGE

CROSS-REFERENCE TO RELATED APPLICATIONS

This application is a continuation of application Ser. No. 12/112,840 filed Apr. 30, 2008 now abandoned. Also, the disclosure of the following priority application is herein incorporated by reference:
Japanese Patent Application No. 2007-142228 filed on May 29, 2007; and
Japanese Patent Application No. 2008-113408 filed on Apr. 24, 2008.

BACKGROUND OF THE INVENTION

1. Field of the Invention

The present invention relates to a zoom lens system, an optical apparatus, and a method for forming an image of an object.

2. Related Background Art

There has been proposed a zoom lens as a high zoom ratio zoom lens, which is composed of, in order from an object, a first lens group having positive refractive power, a second lens group having negative refractive power, a third lens group having positive refractive power, and a fourth lens group having positive refractive power, and carrying out zooming by moving each lens group such as Japanese Patent Application Laid-Open No. 2003-241097.

However, such a conventional zoom lens having a low zoom ratio has not sufficiently satisfied the demand for a high zoom ratio. Moreover, when focusing is to be carried out by the second lens group, since a moving amount of the image plane corresponding to slippage (an amount of play) of a stopping position of the focusing lens group becomes large, stopping accuracy of the focusing lens group is required to be high.

SUMMARY OF THE INVENTION

According to a first aspect of the present invention, there is provided a zoom lens system comprising, in order from an object along an optical axis: a first lens group having positive refractive power; a second lens group having negative refractive power; at least one lens group having positive refractive power; and an n-th lens group being disposed to the most image side, the n-th lens group with positive refractive power including, in order from the object, a front group and a rear group having positive refractive power, focusing on the object being carried out by moving the rear group along the optical axis, and the following conditional expression (1) being satisfied:

$$0.05 < D/fNb < 0.50 \qquad (1)$$

where D denotes a distance along the optical axis between the most image side surface of the front group and the most object side surface of the rear group upon focusing on infinity, and fNb denotes a focal length of the rear group.

According to a second aspect of the present invention, there is provided a zoom lens system comprising, in order from an object along an optical axis: a first lens group having positive refractive power; a second lens group having negative refractive power; and an n-th lens group being disposed to the most image side, a lens group capable of moving in a direction perpendicular to the optical axis being included between the first lens group and the n-th lens group, the n-th lens group with positive refractive power including, in order from the object, a front group and a rear group having positive refractive power, and focusing on the object being carried out by moving the rear group along the optical axis.

According to a third aspect of the present invention, there is provided an optical apparatus equipped with a zoom lens system according to the first or second aspect.

According to a fourth aspect of the present invention, there is provided a method for forming an image of an object by a zoom lens system comprising steps of: providing the zoom lens system comprising, in order from the object along an optical axis, a first lens group having positive refractive power, a second lens group having negative refractive power, at least one lens group having positive refractive power, and an n-th lens group being disposed to the most image side, the n-th lens group with positive refractive power including, in order from the object, a front group and a rear group having positive refractive power; moving the rear group along the optical axis upon focusing on the object; and satisfying the following conditional expression (1):

$$0.05 < D/fNb < 0.50 \qquad (1)$$

where D denotes a distance along the optical axis between the most image side surface of the front group and the most object side surface of the rear group upon focusing on infinity, and fNb denotes a focal length of the rear group.

According to fifth aspect of the present invention, there is provided a method for correcting an image blur of an zoom lens system comprising steps of: providing the zoom lens system comprising, in order from an object along an optical axis, a first lens group having positive refractive power, a second lens group having negative refractive power, and an n-th lens group being disposed to the most image side, the n-th lens group with positive refractive power including, in order from the object, a front group and a rear group having positive refractive power; moving the rear group along the optical axis upon focusing; and shifting a lens group disposed between the first lens group and the n-th lens group in a direction perpendicular to the optical axis for correcting the image blur.

According to a sixth aspect of the present invention, there is provided a method for zooming a zoom lens system comprising steps of: providing the zoom lens system comprising, in order from an object along an optical axis, a first lens group having positive refractive power, a second lens group having negative refractive power, at least one lens group having positive refractive power, and an n-th lens group being disposed to the most image side, the n-th lens group with positive refractive power including, in order from the object, a front group and a rear group having positive refractive power, moving the rear group along the optical axis upon focusing on the object; varying a distance between the first lens group and the second lens group, a distance between the second lens group and the positive lens group, and a distance between the positive lens group and the n-th lens group upon zooming; and satisfying the following conditional expression (1):

$$0.05 < D/fNb < 0.50 \qquad (1)$$

where D denotes a distance along the optical axis between the most image side surface of the front group and the most object side surface of the rear group upon focusing on infinity, and fNb denotes a focal length of the rear group.

The present invention makes it possible to provide a zoom lens system having a high zoom ratio being compact with high optical performance.

BRIEF DESCRIPTION OF THE DRAWINGS

FIGS. 2A, 2B and 2C are graphs showing various aberrations of the zoom lens system according to Example 1 upon focusing on infinity without performing vibration reduction, in which FIG. 2A is in a wide-angle end state (f=7.35), FIG. 2B is in an intermediate focal length state (f=26.70), and FIG. 2C is in a telephoto end state (f=74.50).

FIGS. 3A, 3B and 3C are graphs showing coma of the zoom lens system according to Example 1 upon focusing on infinity with performing vibration reduction, in which FIG. 3A is in a wide-angle end state (f=7.35), FIG. 3B is in an intermediate focal length state (f=26.70), and FIG. 3C is in a telephoto end state (f=74.50).

FIG. 4 is a sectional view showing a lens configuration of a zoom lens system according to Example 2 together with a zoom trajectory of each lens group.

FIGS. 5A, 5B and 5C are graphs showing various aberrations of the zoom lens system according to Example 2 upon focusing on infinity without performing vibration reduction, in which FIG. 5A is in a wide-angle end state (f=7.35), FIG. 5B is in an intermediate focal length state (f=26.70), and FIG. 5C is in a telephoto end state (f=74.50).

FIGS. 6A, 6B and 6C are graphs showing coma of the zoom lens system according to Example 2 upon focusing on infinity with performing vibration reduction, in which FIG. 6A is in a wide-angle end state (f=7.35), FIG. 6B is in an intermediate focal length state (f=26.70), and FIG. 6C is in a telephoto end state (f=74.50).

FIGS. 8A, 8B and 8C are graphs showing various aberrations of the zoom lens system according to Example 3 upon focusing on infinity without performing vibration reduction, in which FIG. 8A is in a wide-angle end state (f=7.35), FIG. 8B is in an intermediate focal length state (f=26.70), and FIG. 8C is in a telephoto end state (f=74.50).

FIGS. 9A, 9B and 9C are graphs showing coma of the zoom lens system according to Example 3 upon focusing on infinity with performing vibration reduction, in which FIG. 9A is in a wide-angle end state (f=7.35), FIG. 9B is in an intermediate focal length state (f=26.70), and FIG. 9C is in a telephoto end state (f=74.50).

FIGS. 10A and 10B are diagrams showing an electronic still camera equipping the zoom lens system according to Example 1, in which FIG. 10A is a front view, and FIG. 10B is a rear view.

FIG. 11 is a sectional view along A-A line in FIG. 10A.

DESCRIPTION OF THE MOST PREFERRED EMBODIMENT

Figure 1:
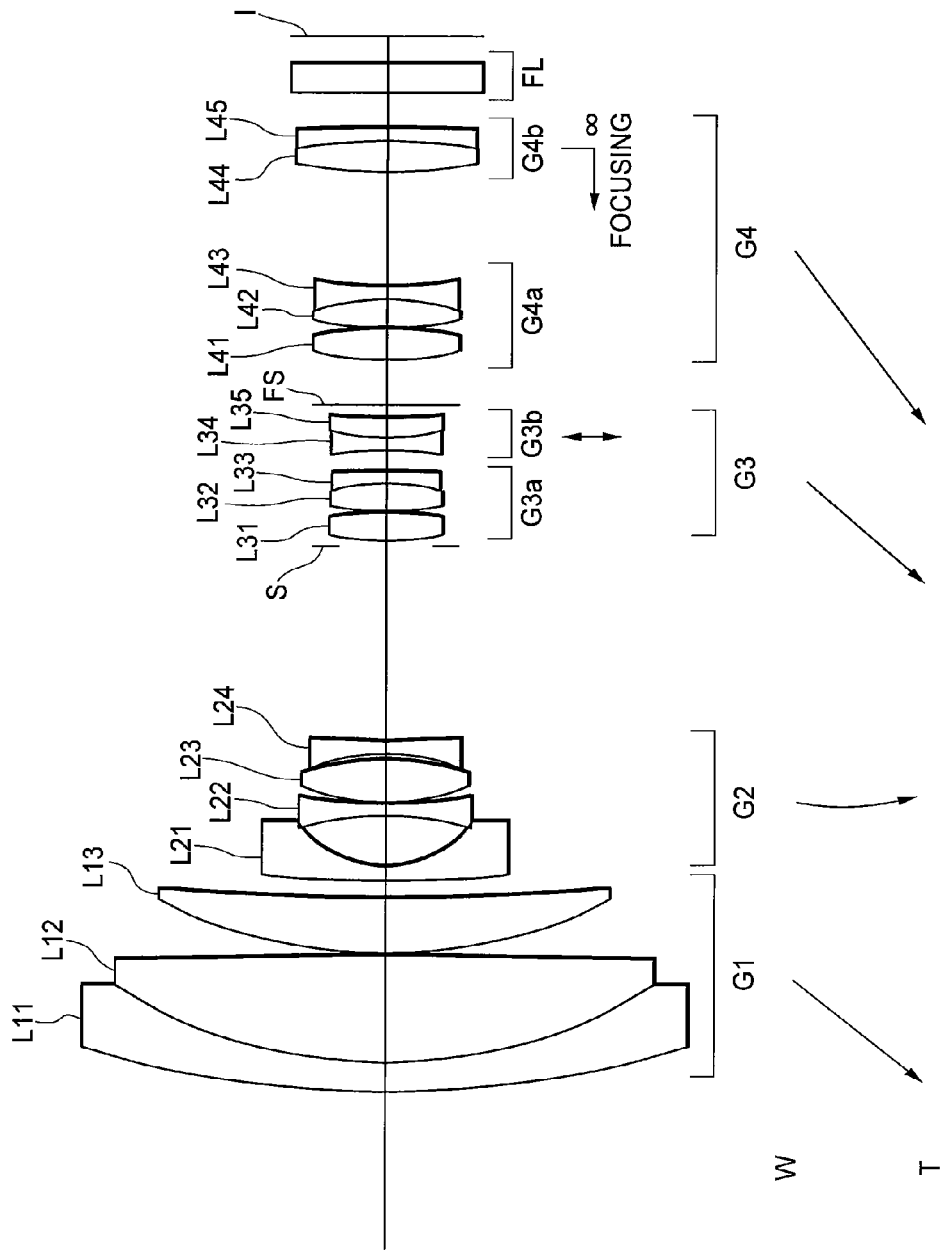
FIG. 1 is a sectional view showing a lens configuration of a zoom lens system according to Example 1 together with a zoom trajectory of each lens group.

A zoom lens system according to the present embodiment is explained below.

A zoom lens system according to the present embodiment includes, in order from an object along an optical axis, a first lens group having positive refractive power, a second lens group having negative refractive power, and an n-th lens group being disposed to the most image side. The n-th lens group with positive refractive power includes, in order from the object, a front group and a rear group having positive refractive power. Focusing on an object is carried out by moving the rear group along the optical axis.

In order to construct a zoom lens system to be a high zoom ratio, the zoom lens system is necessary to be constructed by a plurality of lens groups such as a first lens group having positive refractive power, a second lens group having negative refractive power, and succeeding lens groups, and zooming has to be carried out by moving respective lens groups effectively. On the other hand, in order to carry out focusing on an object locating at a finite distance by moving a focusing lens group by means of a drive mechanism such as a motor, an internal focusing system or a rear focusing system, in which the focusing lens group is light and compact, is advantageous. When a zoom lens system is made to be a higher zoom ratio, since the focal length of the zoom lens system in a telephoto end state becomes large, the internal focusing system, in which the moving amount of the focusing lens can be small, is further effective.

With decreasing the size of an imaging device, an allowable diameter of an image blur caused by defocus, which is a so-called circle of confusion, becomes small, so that higher precision is required for focusing. Accordingly, in focusing by means of the second lens group, required stopping precision becomes even higher, so that a moving amount of the focusing position at the image plane caused by a play of the stopping position becomes large. As a result, the focusing position excessively displaces from an original focusing position, so that contrast becomes low.

In a zoom lens system according to the present embodiment, an n-th lens group having positive refractive power is divided into, in order from the object, a front group and a rear group having positive refractive power. Focusing is carried out by moving the rear group along an optical axis. With this configuration, the moving amount of the image plane position corresponding to the play of the focusing lens group can be small, so that the zoom lens system can obtain high optical performance and compactness.

In a zoom lens system according to the present embodiment, the following conditional expression (1) is satisfied:

$$0.05 < D/fNb < 0.50 \quad (1)$$

where D denotes a distance along the optical axis between the most image side surface of the front group and the most object side surface of the rear group upon focusing on infinity, and fNb denotes a focal length of the rear group.

Conditional expression (1) defines a ratio of the distance between the front group and the rear group to the focal length of the rear group.

When the value D/fNb is equal to or falls below the lower limit of conditional expression (1), the moving amount required for focusing becomes large, so that the range capable of being focused becomes narrow. Moreover, variation in curvature of field becomes large, so that it becomes difficult to obtain excellent optical performance over a broad focusing range.

When the value D/fNb is equal to or exceeds the upper limit of conditional expression (1), the n-th lens group becomes large. Moreover, refractive power of the rear group becomes large, so that spherical aberration becomes worse.

With satisfying conditional expression (1), it becomes possible to obtain a wider focusing range with excellent optical performance over entire focusing range.

In order to secure the effect of the present embodiment, it is preferable to set the lower limit of conditional expression (1) to 0.10. In order to secure the effect of the present embodiment, it is preferable to set the upper limit of conditional expression (1) to 0.35.

In a zoom lens system according to the present embodiment, it is preferable that the n-th lens group is a fourth lens group in order from the object, and a third lens group having positive refractive power is there between the fourth lens group and the second lens group. With adopting such a four-lens-group configuration, it becomes possible to accomplish high optical performance and compactness.

In a zoom lens system according to the present embodiment, it is preferable that zooming is carried out by varying a distance between the first lens group and the second lens group, a distance between the second lens group and the third lens group, and a distance between the third lens group and the fourth lens group. With varying each lens group as stated above, zooming can be carried out effectively by each lens group.

In a zoom lens system according to the present embodiment, the following conditional expression (2) is preferably satisfied:

$$0.20 < D/(fw \times ft)^{1/2} < 0.50 \quad (2)$$

where fw denotes a focal length of the zoom lens system in a wide-angle end state, and ft denotes a focal length of the zoom lens system in a telephoto end state.

Conditional expression (2) defines a relation between a distance from the front group to the rear group in the fourth lens group and the focal length of the zoom lens system.

When the value $D/(fw \times ft)^{1/2}$ is equal to or falls below the lower limit of conditional expression (2), the distance from the front group to the rear group becomes small with respect to the focal length of the zoom lens system. Accordingly, in order to carry out focusing, refractive power of the rear group has to be large, so that spherical aberration becomes worse.

On the other hand, when the value $D/(fw \times ft)^{1/2}$ is equal to or exceeds the upper limit of conditional expression (2), the fourth lens group becomes large, so that the back focal length cannot be secured. Moreover, curvature of field becomes worse.

In order to secure the effect of the present embodiment, it is preferable to set the lower limit of conditional expression (2) to 0.23. In order to secure the effect of the present embodiment, it is preferable to set the upper limit of conditional expression (2) 0.40.

With satisfying conditional expression (2), it becomes possible to accomplish a compact zoom lens system having a wide focusing range with keeping excellent optical performance.

In a zoom lens system according to the present embodiment, it is preferable that upon zooming from a wide-angle end state to a telephoto end state, a distance between the first lens group and the second lens group increases, a distance between the second lens group and the third lens group decreases, and a distance between the third lens group and the fourth lens group decreases. With moving each lens group as stated above, it becomes possible to effectively zoom by each lens group. Moreover, with appropriately arrange the distance between the third lens group and the fourth lens group in an intermediate focal length state, it becomes possible to correct curvature of field, and to accomplish excellent optical performance over entire zoom range.

In a zoom lens system according to the present embodiment, the following conditional expression (3) is preferably satisfied:

$$-0.16 < f2/f1 < -0.08 \quad (3)$$

where f1 denotes a focal length of the first lens group, and f2 denotes a focal length of the second lens group.

Conditional expression (3) defines a ratio of the focal length of the first lens group to that of the second lens group.

When the ratio f1/f2 is equal to or falls below the lower limit of conditional expression (3), refractive power of the second lens group becomes too small, so that in order to construct the zoom lens system to be a high zoom ratio, the total lens length becomes too long. Otherwise, since refractive power of the first lens group becomes large, spherical aberration in the telephoto end state in particular becomes worse.

On the other hand, when the ratio f1/f2 is equal to or exceeds the upper limit of conditional expression (3), refractive power of the second lens group becomes large, so that variations in astigmatism and curvature of field upon zooming become large.

In order to secure the effect of the present embodiment, it is preferable to set the lower limit of conditional expression (3) to −0.14. In order to secure the effect of the present embodiment, it is preferable to set the upper limit of conditional expression (3) to −0.09.

With satisfying conditional expression (3), it becomes possible to accomplish a high zoom ratio and excellent optical performance.

In a zoom lens system according to the present embodiment, the following conditional expression (4) is preferably satisfied:

$$0.75 < f3/f4 < 2.00 \quad (4)$$

where f3 denotes a focal length of the third lens group, and f4 denotes a focal length of the fourth lens group.

Conditional expression (4) defines a ratio of the focal length of the third lens group to that of the fourth lens group.

When the ratio f3/f4 is equal to or falls below the lower limit of conditional expression (4), refractive power of the third lens group becomes large, variations in aberrations upon zooming become large, and in particular spherical aberration and coma become worse.

On the other hand, when the ratio f3/f4 is equal to or exceeds the upper limit of conditional expression (4), the total lens length becomes large, so that it becomes difficult to accomplish compactness. Otherwise, in order to make the system compact, a combined focal length of the first lens group and the second lens group has to be small, so that spherical aberration in the telephoto end state becomes worse.

In order to secure the effect of the present embodiment, it is preferable to set the lower limit of conditional expression (4) to 0.85. In order to secure the effect of the present embodiment, it is preferable to set the upper limit of conditional expression (4) to 1.50.

With satisfying conditional expression (4), it becomes possible to accomplish a compact zoom lens system having excellent optical performance with small variation in aberration upon zooming.

In a zoom lens system according to the present embodiment, the front group of the n-th lens group preferably has at least one aspherical surface. With using an aspherical surface in the front group, it becomes possible to correct spherical aberration excellently.

In a zoom lens system according to the present embodiment, it is preferable that the third lens group includes, in order from the object, a front group having positive refractive power and a rear group having negative refractive power, and has a vibration reduction function that corrects variation in the image forming position cased by a camera shake by means of decentering the rear group of the third lens group in a direction perpendicular to the optical axis. The following conditional expression (5) is preferably satisfied:

$$-1.00 < f3a/f3b < -0.40 \quad (5)$$

where f3a denotes a focal length of the front group in the third lens group, and f3b denotes a focal length of the rear group in the third lens group.

In order to carry out vibration reduction by decentering a portion of a photo-taking lens, it is necessary for the photo-taking lens to equip a mechanism of decentering. In order to make the mechanism compact, it is preferable that the diameter of the lens is small and light. In a zoom lens system according to the present embodiment, since the third lens group has the smallest lens diameter, it is the most suitable to be equipped with the vibration reduction mechanism.

With dividing the third lens group into a front group having positive refractive power and a rear group having negative refractive power, and allotting the vibration reduction function to the rear group, it becomes possible to reduce deterioration in optical performance upon decentering the vibration reduction lens group and to reduce weight of the vibration reduction lens group.

Conditional expression (5) defines the ratio of the focal length of the front group to that of the rear group in the third lens group.

When the ratio f3a/f3b is equal to or falls below the lower limit of conditional expression (5), refractive power of the rear group becomes large, so that decentering sensitivity of the rear group becomes large, and an amount of decentering required for the vibration reduction becomes small. However, it becomes difficult to correct coma upon decentering.

On the other hand, when the ratio f3a/f3b is equal to or exceeds the upper limit of conditional expression (5), refractive power of the rear group becomes small, so that it becomes difficult to correct spherical aberration. Moreover, the amount of decentering upon carrying out vibration reduction becomes large, so that the vibration reduction mechanism becomes large.

In order to secure the effect of the present embodiment, it is preferable to set the lower limit to −0.85. In order to secure the effect of the present embodiment, it is preferable to set the upper limit to −0.50.

With satisfying conditional expression (5), it becomes possible to make the vibration reduction mechanism compact with securing excellent optical performance.

In a zoom lens system according to the present embodiment, the following conditional expression (6) is preferably satisfied:

$$2.00 < f3/fw < 4.00 \quad (6)$$

where f3 denotes a focal length of the third lens group, and fw denotes a focal length of the zoom lens system in the wide-angle end state.

Conditional expression (6) defines a ratio of the focal length of the third lens group to that of the zoom lens system in the wide-angle end state.

When the ratio f3/fw is equal to or falls below the lower limit of conditional expression (6), refractive power of the third lens group becomes large, spherical aberration becomes worse, and variation in aberration such as coma upon zooming becomes large. Moreover, deterioration in optical performance is generated by displacement of a distance or relative decentering between the third lens group and the fourth lens group.

On the other hand, when the ratio f3/fw is equal to or exceeds the upper limit of conditional expression (6), the total lens length becomes large, so that it becomes difficult to make the system compact. Otherwise, in order to make the system compact, the combined focal length of the first lens group and the second lens group is necessary to be small, so that spherical aberration in the wide-angle end state becomes worse.

In order to secure the effect of the present embodiment, it is preferable to set the lower limit of conditional expression (6) to 2.20. In order to secure the effect of the present embodiment, it is preferable to set the upper limit of conditional expression (6) to 3.50.

With satisfying conditional expression (6), it becomes possible to make the zoom lens system compact with securing excellent optical performance.

In a zoom lens system according to the present embodiment, it is preferable that the rear group of the third lens group has at least one aspherical surface. With including an aspherical surface in the vibration reduction lens group, it becomes possible to excellently correct coma and curvature of field upon decentering the vibration reduction lens group.

The aspherical surface in the rear group of the third lens group preferably has a shape that positive refractive power becomes gradually strong or negative refractive power becomes gradually weak as the radius increases from the optical axis toward the periphery.

Each example according to the present embodiment is explained below with reference to accompanying drawings.

Example 1

FIG. 1 is a sectional view showing a lens configuration of a zoom lens system according to Example 1 together with a zoom trajectory of each lens group.

The zoom lens system according to Example 1 is composed of, in order from an object along an optical axis, a first lens group G1 having positive refractive power, a second lens group G2 having negative refractive power, a third lens group G3 having positive refractive power, and a fourth lens group having positive refractive power locating to the most image plane I side.

Upon zooming from a wide-angle end state W to a telephoto end state T, the first lens group G1, the third lens group G3 and the fourth lens group G4 are moved toward the object, and the second lens group G2 is moved such that a distance between the first lens group G1 and the second lens group G2 increases, a distance between the second lens group G2 and the third lens group G3 decreases, and a distance between the third lens group G3 and the fourth lens group G4 decreases.

The fourth lens group G4 is composed of, in order from the object, a front group G4a having positive refractive power, and a rear group G4b having positive refractive power. Focusing from infinity to a close object is carried out by moving the rear group G4b along the optical axis.

The third lens group G3 is composed of, in order from the object side, a front group G3a having positive refractive power, and a rear group G3b having negative refractive power. The rear group G3b is movable in a direction substantially perpendicular to the optical axis to correct displacement of the image forming position caused by a camera shake.

The first lens group G1 is composed of, in order from the object, a cemented lens constructed by a negative meniscus lens L11 having a concave surface facing the image plane I cemented with a double convex positive lens L12, and a positive meniscus lens L13 having a convex surface facing the object.

The second lens group G2 is composed of, in order from the object, a negative meniscus lens L21 having a concave surface facing the image plane I, a double concave negative lens L22, a double convex positive lens L23, and a double concave negative lens L24. The image plane I side surface of the negative meniscus lens L21 is an aspherical surface.

The front group G3a of the third lens group G3 is composed of, in order from the object, a double convex positive lens L31, and a cemented lens constructed by a double convex positive lens L32 cemented with a plano-concave negative lens L33 having a plane surface facing the image plane I.

The rear group G3b of the third lens group G3 is composed of a cemented lens constructed by, in order from the object, a double concave negative lens L34 cemented with a positive meniscus lens L35 having a convex surface facing the object. The object side surface of the negative lens L34 is an aspherical surface.

The front group G4a of the fourth lens group G4 is composed of, in order from the object, a double convex positive lens L41, and a cemented lens constructed by a double convex positive lens L42 cemented with a double concave negative lens L43. The image plane I side surface of the positive lens L41 is an aspherical surface.

The rear group G4b of the fourth lens group G4 is composed of a cemented lens constructed by, in order from the object, a double convex positive lens L44 cemented with a negative meniscus lens L45 having a concave surface facing the object.

An aperture stop S is disposed to the object side of the front group G3a of the third lens group G3, a flare stopper FS is disposed to the image plane I side of the rear group G3b of the third lens group G3, and a low-pass filter FL blocking a higher spatial frequency than the resolution limit of the imaging device is disposed to the object side of the image plane I.

The aperture stop S is moved in a body with the third lens group G3 upon zooming.

The flare topper FS is decentered in a body with the rear group G3b of the third lens group G3 in a direction substantially perpendicular to the optical axis upon carrying out vibration reduction.

Various values associated with the zoom lens system according to Example 1 are listed in Table 1.

In [Lens Data], the left most column "I" shows the lens surface number counted in order from the object side, the second column "r" shows a radius of curvature of the lens surface, the third column "d" shows a distance to the next surface, the fourth column "nd" shows refractive index of the material at d-line (wavelength $\lambda$=587.6 nm), and the fifth column "vd" shows Abbe number of the material at d-line (wavelength $\lambda$=587.6 nm). In the fifth column "nd" refractive index of the air nd=1.000000 is omitted. In the second column "r", r=∞ denotes a plane surface. In the third column "d", Bf denotes back focal length.

In [Aspherical Data], an aspherical surface is exhibited by the following expression:

$$X(y)=(y^2/r)/[1+[1-\kappa(y^2/r^2)]^{1/2}]+A4 \times y^4+A6 \times y^6+A8 \times y^8+A10 \times y^{10}$$

where y denotes a vertical height from the optical axis, X(y) denotes a sag amount which is a distance along the optical axis from the tangent surface at the vertex of the aspherical surface to the aspherical surface at the vertical height y from the optical axis, r denotes a radius of curvature of a reference sphere (a paraxial radius of curvature), $\kappa$ denotes a conical coefficient, An denotes an aspherical coefficient of n-th order, and the position of an aspherical surface is expressed by attaching "*" to the right side of the surface number.

In [Specifications], W denotes a wide-angle end state, M denotes an intermediate focal length state, T denotes a telephoto end state, f denotes a focal length of the zoom lens system, FNO denotes an f-number, $\omega$ denotes a half angle of view, and y denotes an image height, TL denotes a total lens length, and Bf denotes a back focal length.

In [Variable Distances], dI denotes a variable distance at the surface number I.

In [Lens Group Data], a starting surface number "I" and a focal length of each lens group are shown.

In respective tables for various values, "mm" is generally used for the unit of length such as the focal length, the radius of curvature and the distance to the next lens surface. However, since similar optical performance can be obtained by an optical system proportionally enlarged or reduced its dimension, the unit is not necessarily to be limited to "mm", and any other suitable unit can be used.

The explanation of reference symbols is the same in the other Examples, so that duplicated explanations are omitted.

TABLE 1

[Lens Data]

| I | r | d | nd | vd |
|---|---|---|---|---|
| Obj. Sur. | ∞ | ∞ | | |
| 1 | 59.0197 | 2.0000 | 1.850260 | 32.35 |
| 2 | 29.4875 | 7.5000 | 1.497820 | 82.52 |
| 3 | −1140.2527 | 0.1000 | | |
| 4 | 28.3176 | 4.0000 | 1.603001 | 65.44 |
| 5 | 145.0000 | (d5) | | |
| 6 | 70.0000 | 1.0000 | 1.773766 | 47.17 |
| 7* | 6.6128 | 3.5000 | | |
| 8 | −21.1315 | 0.9000 | 1.816000 | 46.62 |
| 9 | 27.6417 | 0.1000 | | |
| 10 | 13.4784 | 3.0000 | 1.846660 | 23.78 |
| 11 | −16.7052 | 0.4000 | | |
| 12 | −12.6581 | 0.9000 | 1.816000 | 46.62 |
| 13 | 44.0118 | (d13) | | |
| 14 | ∞ | 0.4000 | Aperture Stop S | |
| 15 | 12.5722 | 2.0000 | 1.603001 | 65.44 |
| 16 | −31.9297 | 0.1000 | | |
| 17 | 16.7784 | 2.0000 | 1.497820 | 82.52 |
| 18 | −12.2167 | 0.8000 | 1.755199 | 27.51 |
| 19 | ∞ | 1.5000 | | |
| 20* | −24.4716 | 0.9000 | 1.773766 | 47.17 |
| 21 | 11.8063 | 1.4000 | 1.805181 | 25.42 |
| 22 | 37.9222 | 1.0000 | | |
| 23 | ∞ | (d23) | FlareStopper FS | |
| 24 | 17.0060 | 2.2000 | 1.693500 | 53.20 |
| 25* | −20.8111 | 0.1000 | | |
| 26 | 19.2800 | 2.0000 | 1.487490 | 70.23 |
| 27 | −14.6984 | 0.9000 | 1.804398 | 39.58 |
| 28 | 23.2799 | 8.0000 | | |
| 29 | 26.8129 | 2.2000 | 1.487490 | 70.23 |
| 30 | −38.5349 | 0.9000 | 1.749504 | 35.33 |
| 31 | −249.6411 | (d31) | | |
| 32 | ∞ | 2.0000 | 1.544370 | 70.51 |
| 33 | ∞ | Bf | | |

[Aspherical Data]

Surface Number: 7

$\kappa$ = 1.0000
A4 = −3.22330E−05
A6 = −2.74540E−06
A8 = 8.21350E−08
A10 = −3.21720E−09

Surface Number: 20

$\kappa$ = 3.3604
A4 = 3.78000E−05
A6 = 1.03380E−06
A8 = 7.39470E−08
A10 = −5.64060E−09

Surface Number: 25

$\kappa$ = −0.7362
A4 = 1.30860E−04

TABLE 1-continued

| | | |
|---|---|---|
| A6 = | 1.69330E–06 | |
| A8 = | –7.41650E–08 | |
| A10 = | 1.73370E–09 | |

[Specifications]

Zoom Ratio: 10.1360

| | W | M | T |
|---|---|---|---|
| f = | 7.35 | 26.70 | 74.50 |
| FNO = | 3.61 | 5.24 | 5.57 |
| ω = | 39.4 | 12.0 | 4.4 |
| Y = | 5.70 | 5.70 | 5.70 |
| TL = | 74.30 | 93.04 | 105.20 |
| Bf = | 1.85 | 1.85 | 1.85 |

[Variable Distances]

| | W | M | T |
|---|---|---|---|
| d5 | 1.2149 | 15.5469 | 29.0559 |
| d13 | 13.8535 | 4.0637 | 0.9995 |
| d23 | 3.1393 | 1.7824 | 1.3411 |
| d31 | 2.5024 | 17.9978 | 20.1540 |

[Lens Group Data]

| Group | I | focal length |
|---|---|---|
| G1 | 1 | 50.13 |
| G2 | 6 | –6.11 |
| G3 | 15 | 22.35 |
| G4 | 24 | 17.44 |

[Values for Conditional Expressions]

| | | |
|---|---|---|
| (1): D/fNb = | 0.12 | (N = 4) |
| (2): D/(fw × ft)$^{1/2}$ = | 0.34 | |
| (3): f2/f1 = | –0.12 | |
| (4): f3/f4 = | 1.28 | |
| (5): f3a/f3b = | –0.67 | |
| (6): f3/fw = | 3.04 | |

Figure 2A:
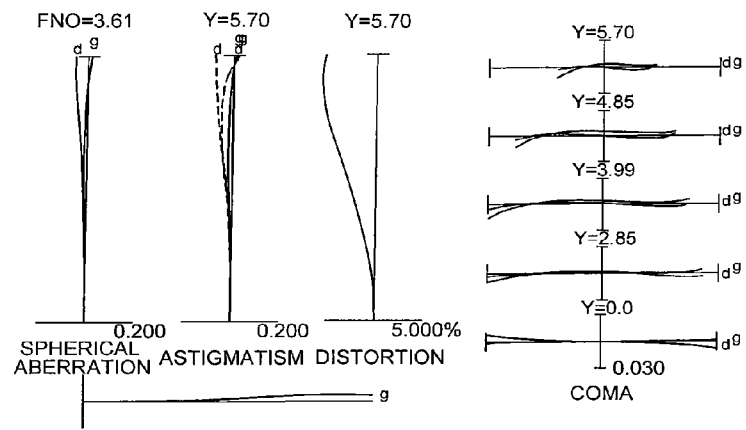
Figure 2B:
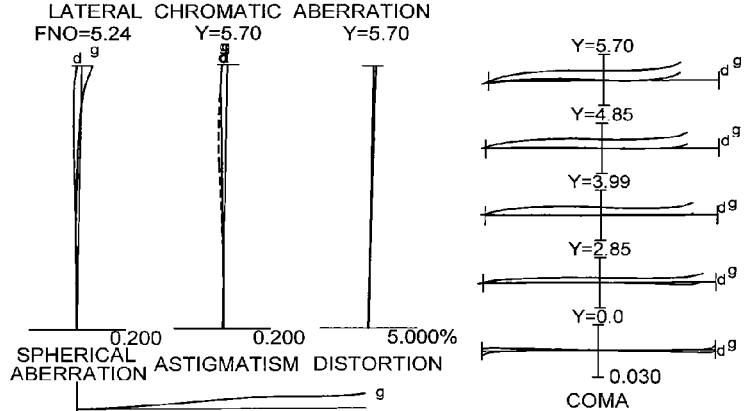
Figure 2C:
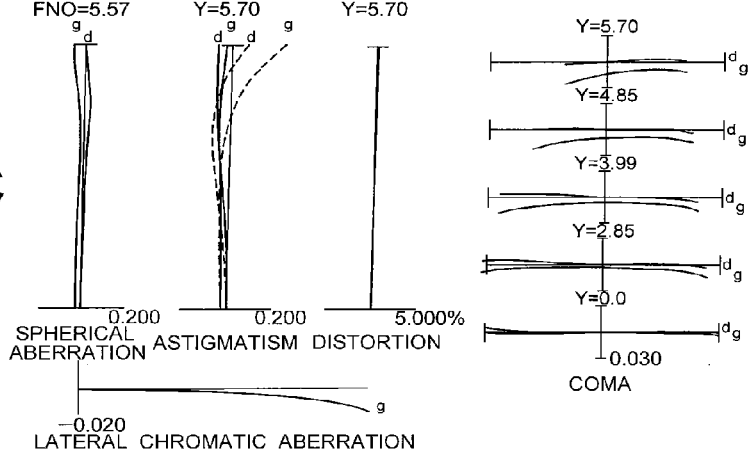
Figure 3A:
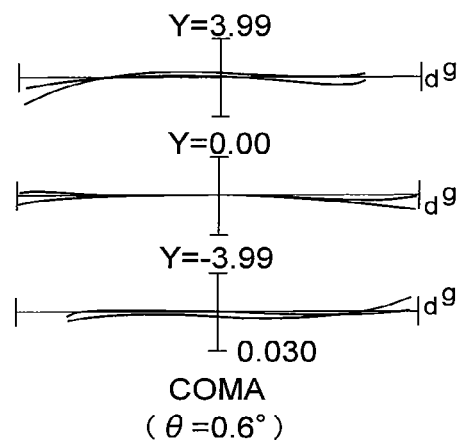
Figure 3B:
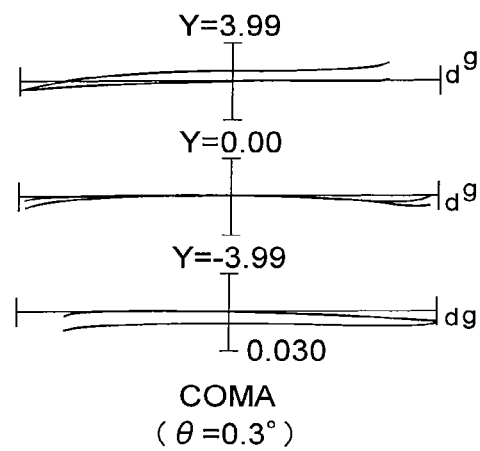
Figure 3C:
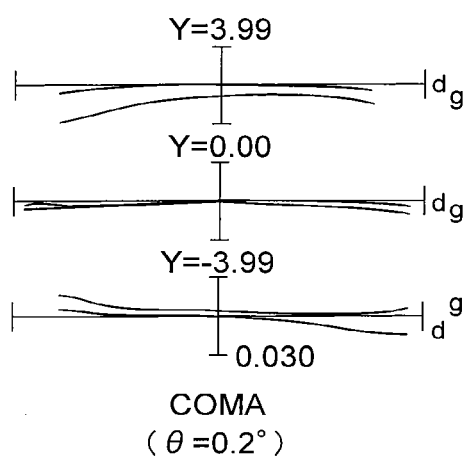

FIGS. 2A, 2B and 2C are graphs showing various aberrations of the zoom lens system according to Example 1 upon focusing on infinity without performing vibration reduction, in which FIG. 2A is in a wide-angle end state (f=7.35), FIG. 2B is in an intermediate focal length state (f=26.70), and FIG. 2C is in a telephoto end state (f=74.50). FIGS. 3A, 3B and 3C are graphs showing coma of the zoom lens system according to Example 1 upon focusing on infinity with performing vibration reduction, in which FIG. 3A is in a wide-angle end state (f=7.35), FIG. 3B is in an intermediate focal length state (f=26.70), and FIG. 3C is in a telephoto end state (f=74.50).

In respective graphs, FNO denotes an f-number, Y denotes an image height. In the graph showing astigmatism, a solid line indicates a sagittal image plane, and a broken line indicates a meridional image plane. In graphs showing coma, coma with respect to each image height is shown. In graphs shown in FIGS. 3A, 3B, 3C, θ denotes a correction angle in degrees upon vibration reduction. In respective graphs, d denotes an aberration curve at d-line (wavelength λ=587.6 nm), and g denotes an aberration curve at g-line (wavelength λ=435.8 nm). The above-described explanation regarding various aberration graphs is the same as the other Examples.

As is apparent from the respective graphs, the zoom lens system according to Example 1 shows superb optical performance as a result of good corrections to various aberrations in the wide-angle end state, in the intermediate focal length state, and in the telephoto end state.

Example 2

FIG. 4 is a sectional view showing a lens configuration of a zoom lens system according to Example 2 together with a zoom trajectory of each lens group.

The zoom lens system according to Example 2 is composed of, in order from an object along an optical axis, a first lens group G1 having positive refractive power, a second lens group G2 having negative refractive power, a third lens group G3 having positive refractive power, and a fourth lens group having positive refractive power locating to the most image plane I side.

Upon zooming from a wide-angle end state W to a telephoto end state T, the first lens group G1, the third lens group G3 and the fourth lens group G4 are moved toward the object, and the second lens group G2 is moved such that a distance between the first lens group G1 and the second lens group G2 increases, a distance between the second lens group G2 and the third lens group G3 decreases, and a distance between the third lens group G3 and the fourth lens group G4 decreases.

The fourth lens group G4 is composed of, in order from the object, a front group G4a having positive refractive power, and a rear group G4b having positive refractive power. Focusing from infinity to a close object is carried out by moving the rear group G4b along the optical axis.

The third lens group G3 is composed of, in order from the object side, a front group G3a having positive refractive power, and a rear group G3b having negative refractive power. The rear group G3b is movable in a direction substantially perpendicular to the optical axis to correct displacement of the image forming position caused by a camera shake.

The first lens group G1 is composed of, in order from the object, a cemented lens constructed by a negative meniscus lens L11 having a concave surface facing the image plane I cemented with a double convex positive lens L12, and a positive meniscus lens L13 having a convex surface facing the object.

The second lens group G2 is composed of, in order from the object, a negative meniscus lens L21 having a concave surface facing the image plane I side, a double concave negative lens L22, a double convex positive lens L23, and a double concave negative lens L24. The negative meniscus lens L21 is an aspherical lens in which an aspherical surface is formed on a resin layer applied on the object side surface.

The front group G3a of the third lens group G3 is composed of, in order from the object, a double convex positive lens L31, and a cemented lens constructed by a double convex positive lens L32 cemented with a negative meniscus lens L33 having a concave surface facing the object.

The rear group G3b of the third lens group G3 is composed of a cemented lens constructed by, in order from the object, a double concave negative lens L34 cemented with a positive meniscus lens L35 having a convex surface facing the object. An aspherical surface is formed on the object side surface of the negative lens L34.

The front group G4a of the fourth lens group G4 is composed of a cemented lens constructed by, in order from the object, a negative meniscus lens L41 having a concave surface facing the image plane I cemented with a double convex positive lens L42. An aspherical surface is formed on the image plane I side of the positive lens L42.

The rear group G4b of the fourth lens group G4 is composed of a cemented lens constructed by, in order from the object, a double convex positive lens L43 cemented with a negative meniscus lens L44 having a concave surface facing the object.

An aperture stop S is disposed to the object side of the front group G3a of the third lens group G3, a flare stopper FS is disposed to the image plane I side of the rear group G3b of the third lens group G3, and a glass block GB such as a color separation prism or a beam splitter and a low-pass filter FL blocking a higher spatial frequency than the resolution limit of the imaging device are disposed to the object side of the image plane I.

The aperture stop S is moved in a body with the third lens group G3 upon zooming.

The flare stopper FS is decentered in a body with the rear group G3b of the third lens group G3 in a direction substantially perpendicular to the optical axis upon carrying out vibration reduction.

Various values associated with a zoom lens system according to Example 2 are listed in Table 2.

TABLE 2

[Lens Data]

| I | r | d | nd | vd |
|---|---|---|---|---|
| Obj. Sur. | ∞ | ∞ | | |
| 1 | 66.0312 | 2.0000 | 1.850260 | 32.35 |
| 2 | 31.8482 | 7.5000 | 1.497820 | 82.52 |
| 3 | −334.7078 | 0.1000 | | |
| 4 | 29.6663 | 4.3000 | 1.603001 | 65.44 |
| 5 | 145.0000 | (d5) | | |
| 6* | 70.0000 | 0.1500 | 1.553890 | 38.09 |
| 7 | 65.0000 | 1.0000 | 1.816000 | 46.62 |
| 8 | 6.8112 | 3.5000 | | |
| 9 | −18.2020 | 0.9000 | 1.816000 | 46.62 |
| 10 | 18.2020 | 0.1000 | | |
| 11 | 12.3957 | 3.1000 | 1.846660 | 23.78 |
| 12 | −14.2739 | 0.4000 | | |
| 13 | −10.6946 | 0.9000 | 1.816000 | 46.62 |
| 14 | 54.4104 | (d14) | | |
| 15 | ∞ | 0.4000 | Aperture Stop S | |
| 16 | 13.3744 | 2.1000 | 1.603001 | 65.44 |
| 17 | −16.9957 | 0.1000 | | |
| 18 | 18.4782 | 2.2000 | 1.497820 | 82.52 |
| 19 | −9.1902 | 0.8000 | 1.834000 | 37.16 |
| 20 | −74.5494 | 1.8000 | | |
| 21* | −22.5435 | 0.9000 | 1.773766 | 47.17 |
| 22 | 13.0325 | 1.5000 | 1.805181 | 25.42 |
| 23 | 32.3340 | 1.0000 | | |
| 24 | ∞ | (d24) | Flare Stopper FS | |
| 25 | 15.0330 | 0.9000 | 1.755199 | 27.51 |
| 26 | 10.3663 | 2.8000 | 1.487489 | 70.44 |
| 27* | −21.4146 | 7.0000 | | |
| 28 | 26.3962 | 2.1000 | 1.516330 | 64.14 |
| 29 | −38.4909 | 0.9000 | 1.755199 | 27.51 |
| 30 | −141.0271 | (d30) | | |
| 31 | ∞ | 10.0000 | 1.516330 | 64.14 |
| 32 | ∞ | 0.5000 | | |
| 33 | ∞ | 1.8000 | 1.544370 | 70.51 |
| 34 | ∞ | Bf | | |

[Aspherical Data]

Surface Number: 6

κ = −4.8424
A4 = 3.92450E−05
A6 = −1.95100E−07
A8 = −6.69080E−10
A10 = 8.24710E−12

Surface Number: 21

κ = 10.1239
A4 = 1.39940E−04
A6 = 2.24510E−06
A8 = 0.00000E+00
A10 = 0.00000E+00

Surface Number: 27

κ = 4.5818
A4 = 2.06960E−04
A6 = 1.53360E−06
A8 = −2.60320E−09
A10 = 0.00000E+00

[Specifications]

Zoom Ratio: 10.1360

| | W | M | T |
|---|---|---|---|
| f = | 7.35 | 26.70 | 74.50 |
| FNO = | 3.61 | 4.81 | 5.52 |
| ω = | 39.3 | 11.9 | 4.4 |
| TL = | 80.46 | 103.83 | 119.93 |
| Bf = | 1.83 | 1.83 | 1.83 |

[Variable Distances]

| | W | M | T |
|---|---|---|---|
| d5 | 1.2034 | 18.4348 | 29.9784 |
| d13 | 11.9674 | 3.9193 | 0.9997 |
| d23 | 3.6796 | 1.5350 | 0.9995 |
| d31 | 1.0307 | 17.3639 | 25.3742 |

[Lens Group Data]

| Group | I | focal length |
|---|---|---|
| G1 | 1 | 51.40 |
| G2 | 6 | −5.28 |
| G3 | 16 | 19.42 |
| G4 | 25 | 17.42 |

[Values for Conditional Expressions]

(1): D/fNb = 0.13 (N = 4)
(2): D/(fw × ft)$^{1/2}$ = 0.30
(3): f2/f1 = −0.10
(4): f3/f4 = 1.12
(5): f3a/f3b = −0.69
(6): f3/fw = 2.64

Figure 5A:
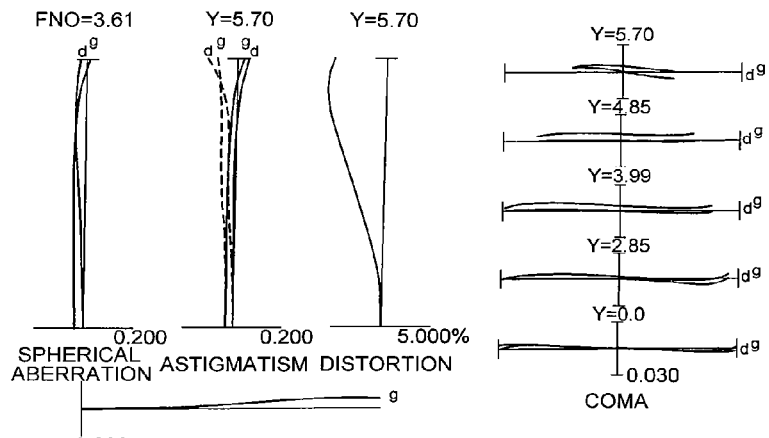
Figure 5B:
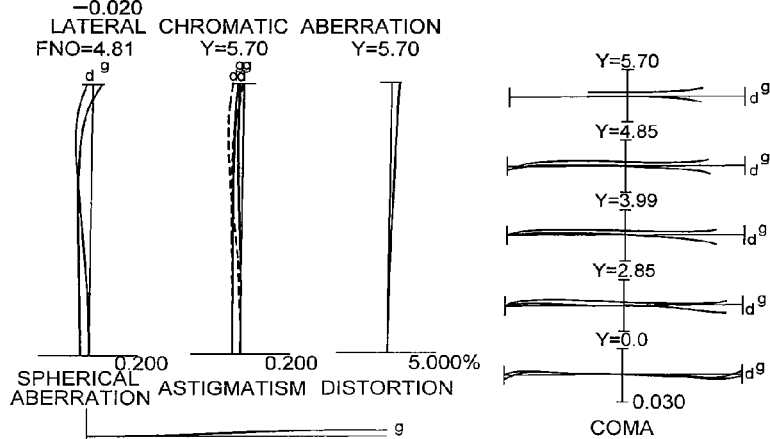
Figure 5C:
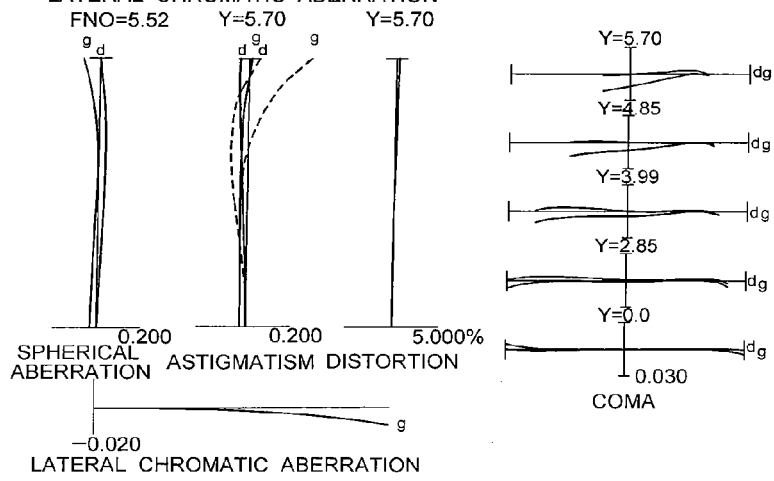
Figure 6A:
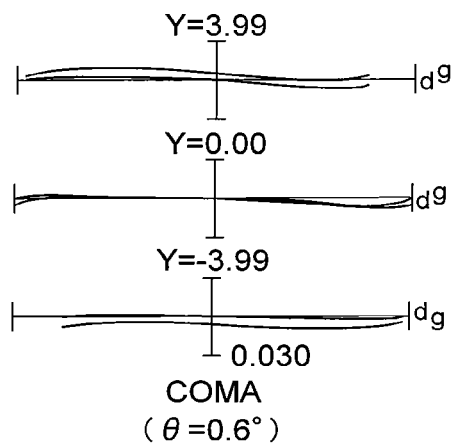
Figure 6B:
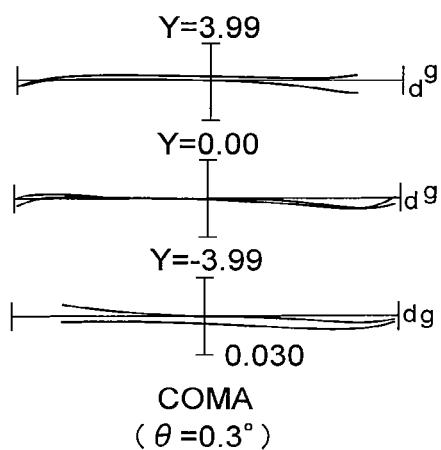
Figure 6C:
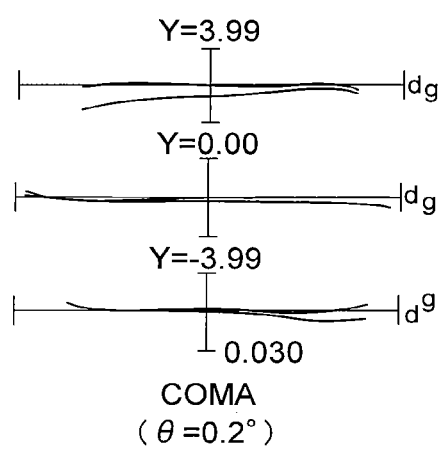

FIGS. 5A, 5B and 5C are graphs showing various aberrations of the zoom lens system according to Example 2 upon focusing on infinity without performing vibration reduction, in which FIG. 5A is in a wide-angle end state (f=7.35), FIG. 5B is in an intermediate focal length state (f=26.70), and FIG. 5C is in a telephoto end state (f=74.50). FIGS. 6A, 6B and 6C are graphs showing coma of the zoom lens system according to Example 2 upon focusing on infinity with performing vibration reduction, in which FIG. 6A is in a wide-angle end state (f=7.35), FIG. 6B is in an intermediate focal length state (f=26.70), and FIG. 6C is in a telephoto end state (f=74.50). In graphs shown in FIGS. 6A, 6B, 6C, θ denotes a correction angle in degrees upon vibration reduction.

As is apparent from the respective graphs, the zoom lens system according to Example 2 shows superb optical performance as a result of good corrections to various aberrations in the wide-angle end state, in the intermediate focal length state, and in the telephoto end state.

Example 3

Figure 7:
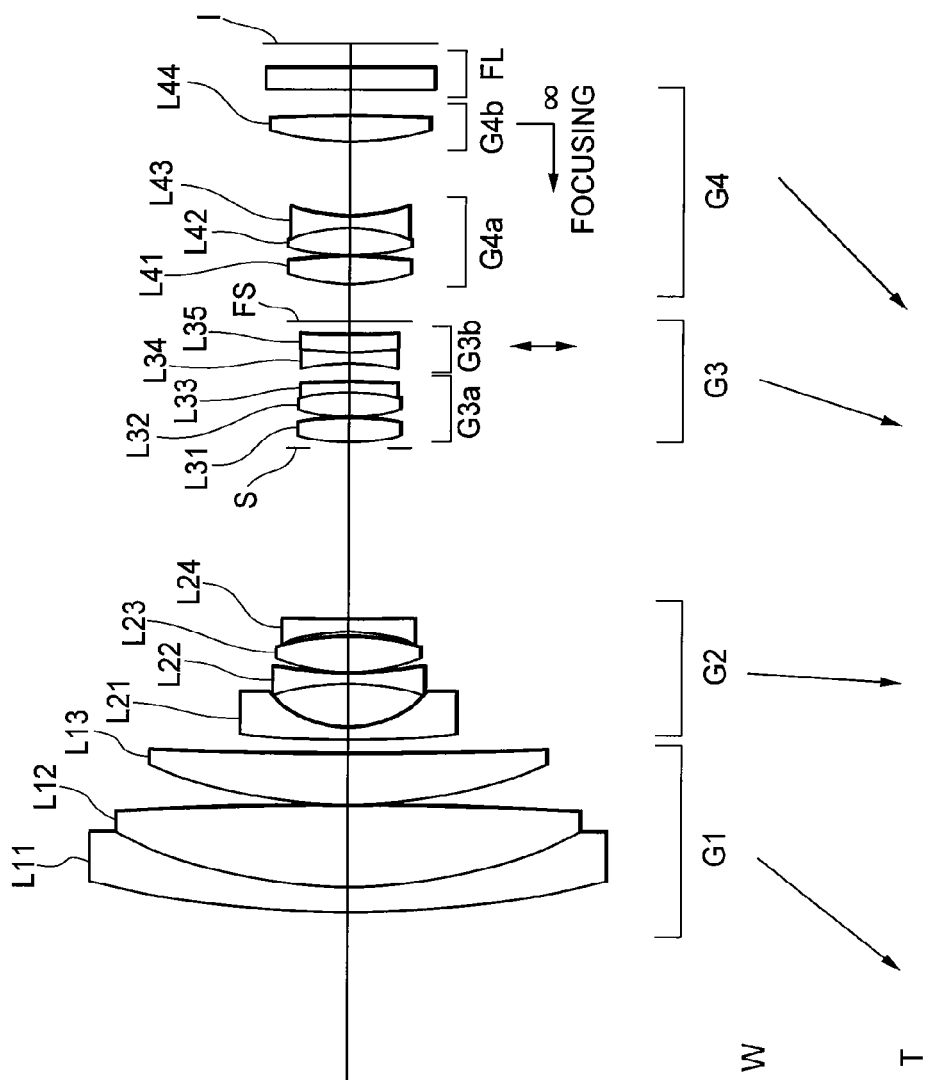
FIG. 7 is a sectional view showing a lens configuration of a zoom lens system according to Example 3 together with a zoom trajectory of each lens group.

FIG. 7 is a sectional view showing a lens configuration of a zoom lens system according to Example 3 together with a zoom trajectory of each lens group.

The zoom lens system according to Example 3 is composed of, in order from an object along an optical axis, a first lens group G1 having positive refractive power, a second lens group G2 having negative refractive power, a third lens group G3 having positive refractive power, and a fourth lens group having positive refractive power locating to the most image plane I side.

Upon zooming from a wide-angle end state W to a telephoto end state T, the first lens group G1, the third lens group G3 and the fourth lens group G4 are moved toward the object, and the second lens group G2 is moved such that a distance between the first lens group G1 and the second lens group G2 increases, a distance between the second lens group G2 and the third lens group G3 decreases, and a distance between the third lens group G3 and the fourth lens group G4 decreases.

The fourth lens group G4 is composed of, in order from the object, a front group G4a having positive refractive power, and a rear group G4b having positive refractive power. Focusing from infinity to a close object is carried out by moving the rear group G4b along the optical axis.

The third lens group G3 is composed of, in order from the object side, a front group G3a having positive refractive power, and a rear group G3b having negative refractive power. The rear group G3b is movable in a direction substantially perpendicular to the optical axis to correct displacement of the image forming position caused by a camera shake.

The first lens group G1 is composed of, in order from the object, a cemented lens constructed by a negative meniscus lens L11 having a concave surface facing the image plane I cemented with a double convex positive lens L12, and a positive meniscus lens L13 having a convex surface facing the object.

The second lens group G2 is composed of, in order from the object, a negative meniscus lens L21 having a concave surface facing the image plane I, a double concave negative lens L22, a double convex positive lens L23, and a double concave negative lens L24. The image plane I side of the negative meniscus lens L21 is an aspherical surface.

The front group G3a of the third lens group G3 is composed of, in order from the object, a double convex positive lens L31, and a cemented lens constructed by a double convex positive lens L32 cemented with a plano-concave negative lens L33 having a plane surface facing the image plane I.

The rear group G3b of the third lens group G3 is composed of a cemented lens constructed by, in order from the object, a double concave negative lens L34 cemented with a positive meniscus lens L35 having a convex surface facing the object. An aspherical surface is formed on the object side surface of the negative lens L34.

The front group G4a of the fourth lens group G4 is composed of, in order from the object side, a double convex positive lens L41, and a cemented lens constructed by a double convex positive lens L42 cemented with a double concave negative lens L43. The image plane I side surface of the positive lens L41 is an aspherical surface.

The rear group G4b of the fourth lens group G4 is composed of a double convex positive lens L44.

An aperture stop S is disposed to the object side of the front group G3a of the third lens group G3, a flare stopper FS is disposed to the image plane I side of the rear group G3b of the third lens group G3, and a low-pass filter FL for blocking a higher spatial frequency than the resolution limit of the imaging device is disposed to the object side of the image plane I.

The aperture stop S is moved in a body with the third lens group G3 upon zooming.

The flare topper FS is decentered in a body with the rear group G3b of the third lens group G3 in a direction substantially perpendicular to the optical axis upon carrying out vibration reduction.

Various values associated with a zoom lens system according to Example 3 are listed in Table 3.

TABLE 3

[Lens Data]

| I | r | d | nd | vd |
|---|---|---|---|---|
| Obj. Sur. | ∞ | ∞ | | |
| 1 | 67.5315 | 2.0000 | 1.850260 | 32.35 |
| 2 | 33.4047 | 6.5000 | 1.497820 | 82.52 |
| 3 | −381.5022 | 0.1000 | | |
| 4 | 32.5444 | 4.0000 | 1.603001 | 65.44 |
| 5 | 200.3752 | (d5) | | |
| 6 | 70.0000 | 0.9000 | 1.773770 | 47.18 |
| 7* | 7.0999 | 3.5000 | | |
| 8 | −20.2833 | 0.9000 | 1.816000 | 46.62 |
| 9 | 24.6910 | 0.1000 | | |
| 10 | 13.7828 | 2.8000 | 1.846660 | 23.78 |
| 11 | −18.9991 | 0.4000 | | |
| 12 | −13.1750 | 0.9000 | 1.816000 | 46.62 |
| 13 | 74.5011 | (d13) | | |
| 14 | ∞ | 0.4000 | Aperture Stop S | |
| 15 | 12.2399 | 2.0000 | 1.603001 | 65.44 |
| 16 | −26.3127 | 0.1000 | | |
| 17 | 13.1192 | 2.0000 | 1.497820 | 82.56 |
| 18 | −15.4816 | 0.8000 | 1.755199 | 27.51 |
| 19 | ∞ | 1.5000 | | |
| 20* | −14.9175 | 0.9000 | 1.773770 | 47.18 |
| 21 | 20.2985 | 1.5000 | 1.805181 | 25.42 |
| 22 | 60.5033 | 1.0000 | | |
| 23 | ∞ | (d23) | Flare Stopper FS | |
| 24 | 12.7064 | 2.2000 | 1.693500 | 53.22 |
| 25* | −28.4147 | 0.1000 | | |
| 26 | 15.8926 | 2.2000 | 1.487490 | 70.23 |
| 27 | −12.0468 | 0.9000 | 1.799516 | 42.22 |
| 28 | 12.3520 | 6.0000 | | |
| 29 | 19.2289 | 2.0000 | 1.516330 | 64.14 |
| 30 | −400.0000 | (d30) | | |
| 31 | ∞ | 2.0000 | 1.544370 | 70.51 |
| 32 | ∞ | Bf | | |

[Aspherical Data]

Surface Number: 7

κ = 0.9803
A4 = −7.93930E−07
A6 = −1.05690E−06
A8 = 1.44520E−08
A10 = 2.07200E−10

Surface Number: 20

κ = 0.1008
A4 = 4.39590E−05
A6 = −1.18600E−07
A8 = 3.80310E−07
A10 = −2.44850E−08

Surface Number: 25

κ = −5.6785
A4 = 2.33270E−04
A6 = 1.02790E−06
A8 = −4.85880E−08
A10 = 8.70610E−10

[Specifications]

Zoom Ratio: 10.1360

| | W | M | T |
|---|---|---|---|
| f = | 7.35 | 26.70 | 74.50 |
| FNO = | 3.69 | 5.08 | 5.57 |
| ω = | 39.2 | 11.8 | 4.3 |
| TL = | 69.68 | 88.60 | 101.97 |
| Bf = | 1.76 | 1.76 | 1.76 |

TABLE 3-continued

[Variable Distances]

|  | W | M | T |
|---|---|---|---|
| d5 | 1.2285 | 18.3628 | 31.4442 |
| d13 | 13.9807 | 4.5865 | 0.9995 |
| d23 | 2.9960 | 1.2072 | 0.9963 |
| d30 | 2.0137 | 14.9775 | 19.0649 |

[Lens Group Data]

| Group | I | focal length |
|---|---|---|
| G1 | 1 | 53.26 |
| G2 | 6 | −6.37 |
| G3 | 15 | 18.06 |
| G4 | 24 | 19.01 |

[Values for Conditional Expressions]

| | | |
|---|---|---|
| (1): D/fNb = | 0.17 | (N = 4) |
| (2): D/(fw × ft)$^{1/2}$ = | 0.25 | |
| (3): f2/f1 = | −0.12 | |
| (4): f3/f4 = | 0.95 | |
| (5): f3a/f3b = | −0.69 | |
| (6): f3/fw = | 2.46 | |

Figure 8A:
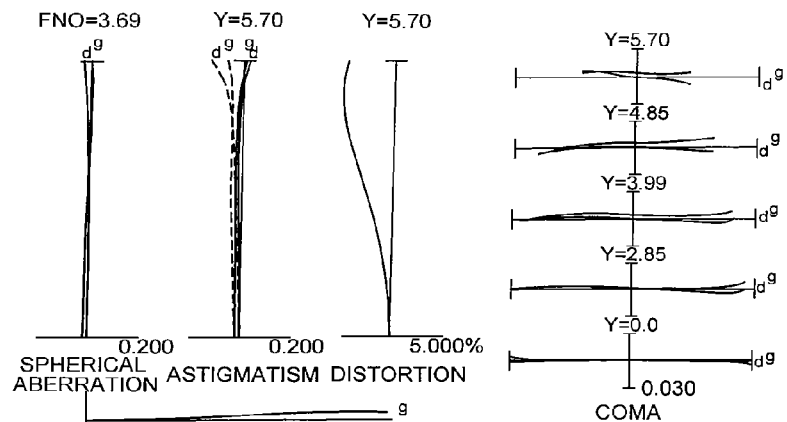
Figure 8B:
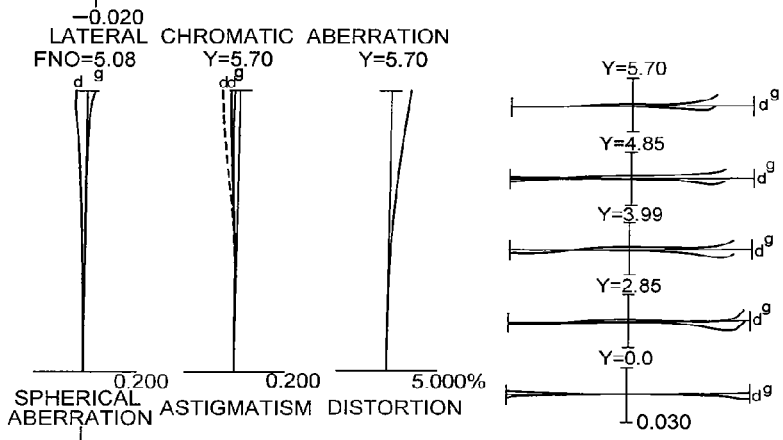
Figure 8C:
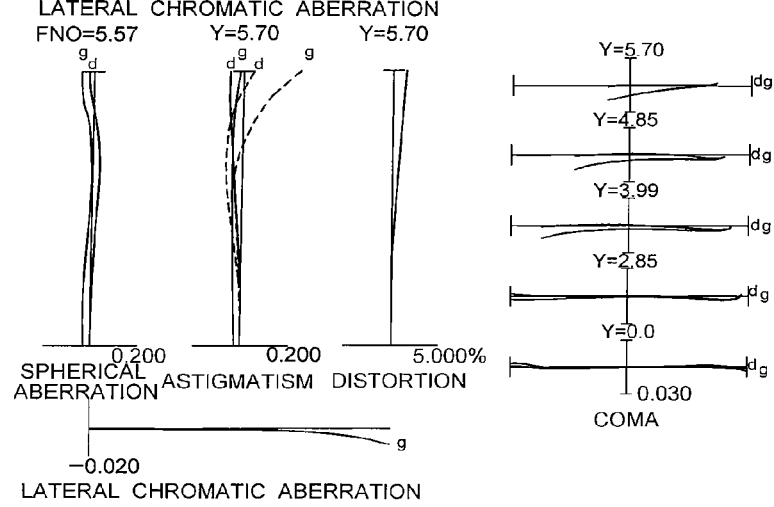
Figure 9A:
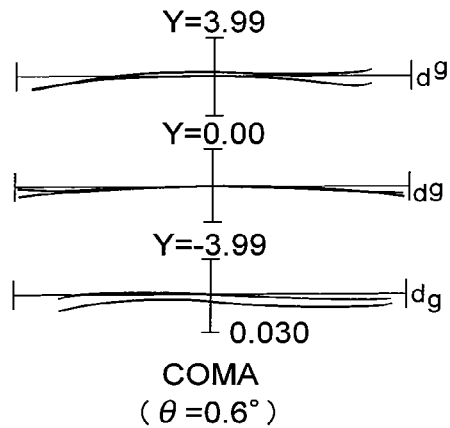
Figure 9B:
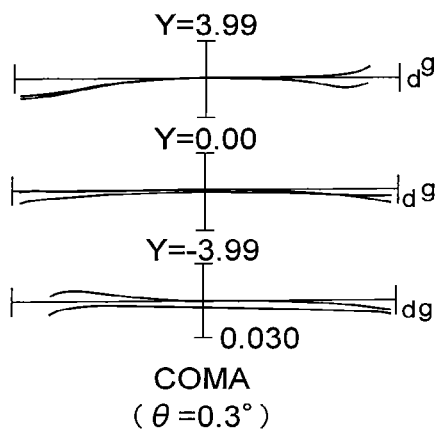
Figure 9C:
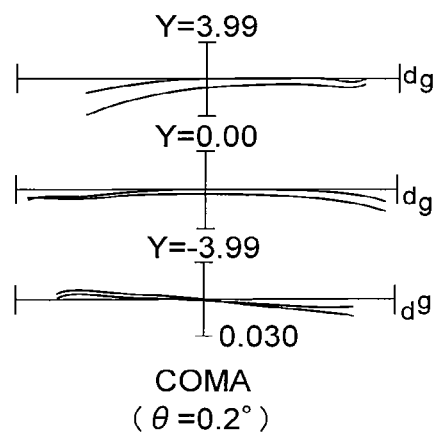

FIGS. 8A, 8B and 8C are graphs showing various aberrations of the zoom lens system according to Example 3 upon focusing on infinity without performing vibration reduction, in which FIG. 8A is in a wide-angle end state (f=7.35), FIG. 8B is in an intermediate focal length state (f=26.70), and FIG. 8C is in a telephoto end state (f=74.50). FIGS. 9A, 9B and 9C are graphs showing coma of the zoom lens system according to Example 3 upon focusing on infinity with performing vibration reduction, in which FIG. 9A is in a wide-angle end state (f=7.35), FIG. 9B is in an intermediate focal length state (f=26.70), and FIG. 9C is in a telephoto end state (f=74.50). In graphs shown in FIGS. 9A, 9B, 9C, θ denotes a correction angle in degrees upon vibration reduction.

As is apparent from the respective graphs, the zoom lens system according to Example 3 shows superb optical performance as a result of good corrections to various aberrations in the wide-angle end state, in the intermediate focal length state, and in the telephoto end state.

Then, a camera equipped with the zoom lens system according to the present embodiment is explained. Although a camera equipped with the zoom lens system according to Example 1 is explained, the same result is obtained with a zoom lens system according to any one of other Examples.

Figure 10A:
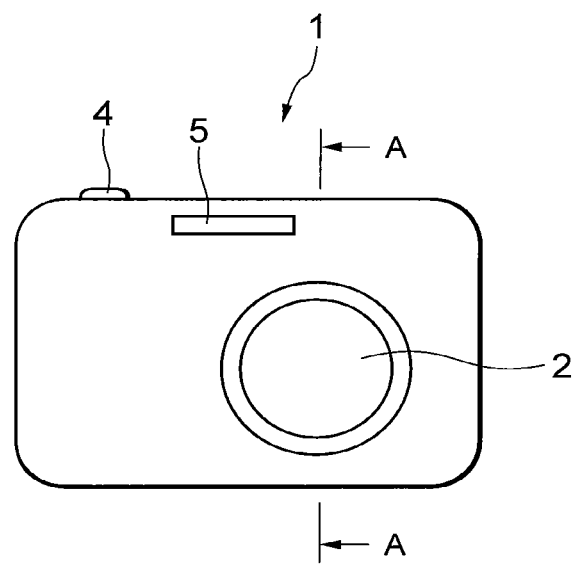
Figure 10B:
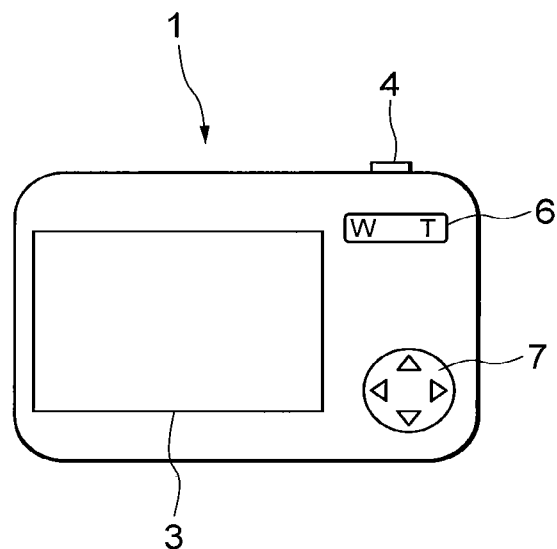

FIGS. 10A and 10B are diagrams showing an electronic still camera equipped with the zoom lens system according to Example 1, in which FIG. 10A is a front view, and FIG. 10B is a rear view. FIG. 11 is a sectional view along A-A line in FIG. 10A.

In an electronic still camera 1 according to the present embodiment shown in FIGS. 10A, 10B and 11, when a power switch button (not shown) is pressed, a shutter (not shown) is opened and light from a subject (not shown) is collected by the image-taking lens 2 and an image is formed on an imaging device C (such as CCD, CMOS, and the like) disposed on an image plane I. The subject image formed on the imaging device C is displayed on a liquid crystal monitor 3 disposed backside of the electronic still camera 1. After fixing the composition of the subject image with observing the liquid crystal monitor 3, a photographer depresses a release button 4 to take a picture of the subject image by the imaging device C, and stores in a memory (not shown).

Moreover, in the electronic still camera 1, the following members are disposed such as an auxiliary light emitter 5 that emits auxiliary light when the subject is dark, a W-T button 6 that makes the zoom lens system, which is the image-taking lens 2, zoom from a wide-angle end state (W) to a telephoto end state (T), and a function button 7 that is used for setting various conditions of the electronic still camera 1.

In the electronic still camera 1 according to the present embodiment, the image-taking lens 2 has a vibration reduction function so as to correct an image blur.

In this manner, the electronic still camera 1 equipped with the zoom lens system 2 according to Example 1 is constructed.

Incidentally, the following description may suitably be applied within limits that do not deteriorate optical performance.

Although a zoom lens system with a four-lens-group configuration is shown as each Example of the present embodiment, the lens-group configuration according to the present embodiment is not limited to this, other lens-group configurations such as a three-lens-group configuration, and a five-lens-group configuration are possible.

In each Example, in order to carry out focusing from infinity to a close object, a portion of a lens group, a single lens group, or a plurality of lens groups may be moved along the optical axis.

The focusing lens group(s) may be used for auto focus, and suitable for being driven by a motor such as an ultrasonic motor. In a zoom lens system according to the present embodiment, it is preferable that the rear group of the fourth lens group is used for the focusing lens group.

A lens group or a portion of a lens group may be sifted in a direction perpendicular to the optical axis as a vibration reduction lens group for correcting an image blur caused by a camera shake. It is particularly preferable that the rear group of the third lens group is used as a vibration reduction lens group.

Moreover, any lens surface may be an aspherical surface. The aspherical surface may be fabricated by a fine grinding process, a glass molding process that a glass material is formed into an aspherical shape by a mold, or a compound type process that a resin material is formed into an aspherical shape on a glass surface.

Although an aperture stop is preferably disposed in the vicinity of the third lens group, the function may be substituted by a lens frame without disposing a member as an aperture stop.

An antireflection coating having high transmittance over a broad wavelength range may be applied to each lens surface to reduce flare or ghost images, so that high optical performance with a high contrast can be attained.

Although a zoom lens is presented in each Example of the present embodiment, it may be a single focal length lens whose distances between respective lens groups are fixed.

The zoom lens may be constructed together with the imaging device in a body, or may be separable from the imaging device such as an interchangeable lens.

The present embodiment only shows a specific example for the purpose of better understanding of the present invention. Accordingly, it is needless to say that the invention in its broader aspect is not limited to the specific details and representative devices shown and described herein, and various modifications may be made without departing from the spirit or scope of the general inventive concept as defined by the appended claims and their equivalents.

Moreover, in a zoom lens system according to the present embodiment, it is preferable that the back focal length Bf that is a distance between the most image side lens surface and the image plane along the optical axis is from about 10 mm to 30 mm, when the back focal length is the minimum.

Moreover, in a zoom lens system according to the present embodiment, it is preferable that the image height is from 5 mm to 12.5 mm. It is most preferable that the image height is from 5 mm to 9.5 mm.

Furthermore, in an optical apparatus using the zoom lens system according to the present embodiment, an image blur may be corrected by shifting at least one lens element included in the zoom lens system in a direction perpendicular to the optical axis, or by shifting the imaging device C in a direction perpendicular to the optical axis.

What is claimed is:

1. A zoom lens system comprising, in order from an object along an optical axis
    a first lens group having positive refractive power;
    a second lens group having negative refractive power;
    a third lens group having positive refractive power; and
    an additional lens group being disposed to the most image side,
    the additional lens group having positive refractive power and including, in order from the object, a front group and a rear group having positive refractive power,
    a distance along the optical axis between the front group and the rear group being fixed upon zooming,
    focusing on the object being carried out by moving the rear group along the optical axis,
    the front group being fixed with respect to an image plane during focusing, and
    the following conditional expression being satisfied:

$0.05 < D/fNb < 0.50$ where D denotes a distance along the optical axis between the most image side surface of the front group and the most object side surface of the rear group upon focusing on infinity, and fNb denotes a focal length of the rear group.

2. The zoom lens system according to claim 1, wherein the additional lens group is a fourth lens group in order from the object, and the third lens group having positive refractive power is included between the second lens group and the fourth lens group.

3. The zoom lens system according to claim 2, wherein the focal length of the zoom lens system is varied by varying a distance between the first lens group and the second lens group, a distance between the second lens group and the third lens group, and a distance between the third lens group and the fourth lens group.

4. The zoom lens system according to claim 1, wherein a lens group capable of moving in a direction perpendicular to the optical axis is included between the first lens group and the additional lens group.

5. The zoom lens system according to claim 1, wherein the following conditional expression is satisfied:

$0.20 < D/(fw \times ft)1/2 < 0.50$ where fw denotes a focal length of the zoom lens system in a wide-angle end state, and ft denotes a focal length of the zoom lens system in a telephoto end state.

6. The zoom lens system according to claim 2, wherein upon zooming from a wide-angle end state to a telephoto end state a distance between the first lens group and the second lens group increases, a distance between the second lens group and the third lens group decreases, and a distance between the third lens group and the fourth lens group decreases.

7. The zoom lens system according to claim 1, wherein upon zooming from a wide-angle end state to a telephoto end state the first lens group is moved toward the object.

8. The zoom lens system according to claim 2, wherein upon zooming from a wide-angle end state to a telephoto end state the third lens group and the fourth lens group are moved toward the object, and the second lens group is moved.

9. The zoom lens system according to claim 1, wherein the following conditional expression is satisfied:

$-0.16 < f2/f1 < -0.08$ where f1 denotes a focal length of the first lens group, and f2 denotes a focal length of the second lens group.

10. The zoom lens system according to claim 2, wherein the following conditional expression is satisfied:

$0.75 < f3/f4 < 2.00$ where f3 denotes a focal length of the third lens group, and f4 denotes a focal length of the fourth lens group.

11. The zoom lens system according to claim 1, wherein the front group of the additional lens group includes at least one aspherical surface.

12. The zoom lens system according to claim 2, wherein the third lens group includes, in order from the object, a front group having positive refractive power and a rear group having negative refractive power, the rear group of the third lens group can be moved in a direction perpendicular to the optical axis, and the following conditional expression is satisfied;

$-1.00 < f3a/f3b < -0.40$ where f3a denotes a focal length of the front group of the third lens group, and f3b denotes a focal length of the rear group of the third lens group.

13. The zoom lens system according to claim 2, wherein the following conditional expression is satisfied:

$2.00 < f3/fw < 4.00$ where f3 denotes a focal length of the third lens group, and fw denotes a focal length of the zoom lens system in a wide-angle end state.

14. The zoom lens system according to claim 12, wherein the rear group of the third lens group includes at least one aspherical surface.

15. The zoom lens system according to claim 1, wherein the rear group in the additional lens group consists of a single lens or a cemented lens.

16. A zoom lens system comprising, in order from an object along an optical axis:
    a first lens group having positive refractive power;
    a second lens group having negative refractive power; and
    an additional lens group being disposed to the most image side,
    a lens group capable of moving in a direction perpendicular to the optical axis being included between the first lens group and the additional lens group,
    the additional lens group having positive refractive power and including, in order from the object, a front group and a rear group having positive refractive power,
    a distance along the optical axis between the front group and the rear group being fixed upon zooming,
    focusing on the object being carried out by moving the rear group along the optical axis, and
    the front group being fixed with respect to an image plane during focusing, wherein
    at least one lens group having positive refractive power is included between the first lens group and the additional lens group.

17. The zoom lens system according to claim 16, wherein the following conditional expression is satisfied:

$$0.05 < D/fNb < 0.50$$

where D denotes a distance along the optical axis between the most image side surface of the front group and the most object side surface of the rear group upon focusing on infinity, and fNb denotes a focal length of the rear group.

18. The zoom lens system according to claim 16, wherein the zoom lens system includes a third lens group having positive refractive power, the additional lens group is a fourth lens group counted from the object, and the third lens group having positive refractive power is included between the fourth lens group and the second lens group.

19. The zoom lens system according to claim 18, wherein the following conditional expression is satisfied:

$$0.75 < f3/f4 < 2.00$$

where f3 denotes a focal length of the third lens group, and f4 denotes a focal length of the fourth lens group.

20. The zoom lens system according to claim 18, wherein the third lens group includes, in order from the object, a front group having positive refractive power and a rear group having negative refractive power, the rear group of the third lens group can be moved in a direction perpendicular to the optical axis.

21. The zoom lens system according to claim 20, wherein the following conditional expression is satisfied:

$$-1.00 < f3a/f3b < -0.40$$

where f3a denotes a focal length of the front group of the third lens group, and f3b denotes a focal length of the rear group of the third lens group.

22. The zoom lens system according to claim 18, wherein the following conditional expression is satisfied:

$$2.00 < f3/fw < 4.00$$

where f3 denotes a focal length of the third lens group, and fw denotes a focal length of the zoom lens system in a wide-angle end state.

23. The zoom lens system according to claim 16, wherein the following conditional expression is satisfied:

$$0.20 < D/(fw \times ft)1/2 < 0.50$$

where D denotes a distance along the optical axis between the most image side surface of the front group and the most object side surface of the rear group upon focusing on infinity, fw denotes a focal length of the zoom lens system in a wide-angle end state, and ft denotes a focal length of the zoom lens system in a telephoto end state.

24. The zoom lens system according to claim 16, wherein the following conditional expression is satisfied:

$$-0.16 < f2/f1 < -0.08$$

where f1 denotes a focal length of the first lens group, and f2 denotes a focal length of the second lens group.

25. The zoom lens system according to claim 16, wherein the rear group in the additional lens group consists of a single lens or a cemented lens.

26. An optical apparatus having the zoom lens system according to claim 16.

27. An optical apparatus having a zoom lens system comprising, in order from an object along an optical axis:
a first lens group having positive refractive power;
a second lens group having negative refractive power;
a third lens group having positive refractive power; and
an additional lens group being disposed to the most image side,
the additional lens group having positive refractive power and including, in order from the object, a front group and a rear group having positive refractive power,
a distance along the optical axis between the front group and the rear group being fixed upon zooming,
focusing on the object being carried out by moving the rear group along the optical axis,
the front group being fixed with respect to an image plane during focusing, and
the following conditional expression being satisfied:

$$0.05 < D/fNb < 0.50$$

where D denotes a distance along the optical axis between the most image side surface of the front group and the most object side surface of the rear group upon focusing on infinity, and fNb denotes a focal length of the rear group.

28. A method for forming an image of an object by a zoom lens system comprising steps of:
providing the zoom lens system comprising, in order from the object along an optical axis, a first lens group having positive refractive power, a second lens group having negative refractive power, a third lens group having positive refractive power, and an additional lens group being disposed to the most image side, the additional lens group having positive refractive power and including, in order from the object, a front group and a rear group having positive refractive power, a distance along the optical axis between the front group and the rear group being fixed upon zooming, and the front group being fixed with respect to an image plane during focusing; and
moving the rear group along the optical axis upon focusing on the object; and
satisfying the following conditional expression:

$$0.05 < D/fNb < 0.50$$

where D denotes a distance along the optical axis between the most image side surface of the front group and the most object side surface of the rear group upon focusing on infinity, and fNb denotes a focal length of the rear group.

29. The method for forming an image of an object according to claim 28, wherein the additional lens group is a fourth lens group counted from the object, and the third lens group having positive refractive power is included between the fourth lens group and the second lens group.

30. The method for forming an image of an object according to claim 28, wherein the rear group in the additional lens group consists of a single lens or a cemented lens.

31. A method for correcting an image blur of a zoom lens system comprising the steps of:
providing the zoom lens system comprising, in order from an object along an optical axis, a first lens group having positive refractive power, a second lens group having negative refractive power, and an additional lens group being disposed to the most image side, the additional lens group having positive refractive power and including, in order from the object, a front group and a rear group having positive refractive power, a distance along the optical axis between the front group and the rear group being fixed upon zooming, the front group being fixed with respect to an image plane during focusing;
moving the rear group along the optical axis upon focusing;

shifting a lens group disposed between the first lens group and the additional lens group in a direction perpendicular to the optical axis for correcting the image blur, and providing a fourth lens group counted from the object as the additional lens group, and a third lens group having positive refractive power between the fourth lens group and the second lens group.

32. The method for correcting an image blur according to claim 31, further comprising the steps of:

providing the third lens group including, in order from the object, a front group having positive refractive power, and a rear group having negative refractive power;

shifting the rear group of the third lens group in a direction perpendicular to the optical axis; and satisfying the following conditional expression:

$$-1.00 < f3a/f3b < -0.40$$

where f3a denotes a focal length of the front group of the third lens group, and f3b denotes a focal length of the rear group of the third lens group.

33. The method for correcting an image blur according to claim 31, further comprising the step of:

satisfying the following conditional expression:

$$2.00 < f3/fw < 4.00$$

where f3 denotes a focal length of the third lens group, and fw denotes a focal length of the zoom lens system in a wide-angle end state.

34. The method for correcting an image blur according to claim 31, wherein the rear group of the third lens group includes at least one aspherical surface.

35. A method for zooming a zoom lens system comprising the steps of:

providing the zoom lens system comprising, in order from an object along an optical axis, a first lens group having positive refractive power, a second lens group having negative refractive power, at least one lens group having positive refractive power, and an additional lens group being disposed to the most image side, the additional lens group having positive refractive power and including, in order from the object, a front group and a rear group having positive refractive power, moving the rear group along the optical axis upon focusing on the object, a distance along the optical axis between the front group and the rear group being fixed upon zooming, and the front group being fixed with respect to an image plane during focusing;

varying a distance between the first lens group and the second lens group, a distance between the second lens group and the positive lens group, and a distance between the positive lens group and the additional lens group upon zooming; and satisfying the following conditional expression:

$$0.05 < D/fNb < 0.50$$

where D denotes a distance along the optical axis between the most image side surface of the front group and the most object side surface of the rear group upon focusing on infinity, and fNb denotes a focal length of the rear group.

36. The method for zooming according to claim 35, further comprising the step of:

moving the first lens group toward the object upon zooming from a wide-angle end state to a telephoto end state.

37. The method for zooming according to claim 35, further comprising the step of:

providing a fourth lens group counted from the object as the additional lens group, and the third lens group having positive refractive power between the fourth lens group and the second lens group.

38. The method for zooming according to claim 37, further comprising the step of:

moving the third lens group and the fourth lens group toward the object and the second lens group upon zooming from a wide-angle end state to a telephoto end state.

* * * * *